Figure 6:
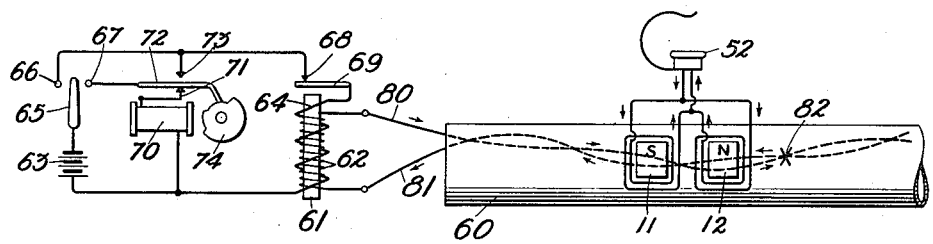

H. M. STOLLER.
FAULT LOCATOR FOR ELECTRIC CABLES.
APPLICATION FILED DEC. 24, 1913.
1,170,017.
Patented Feb. 1, 1916.
2 SHEETS—SHEET 1.
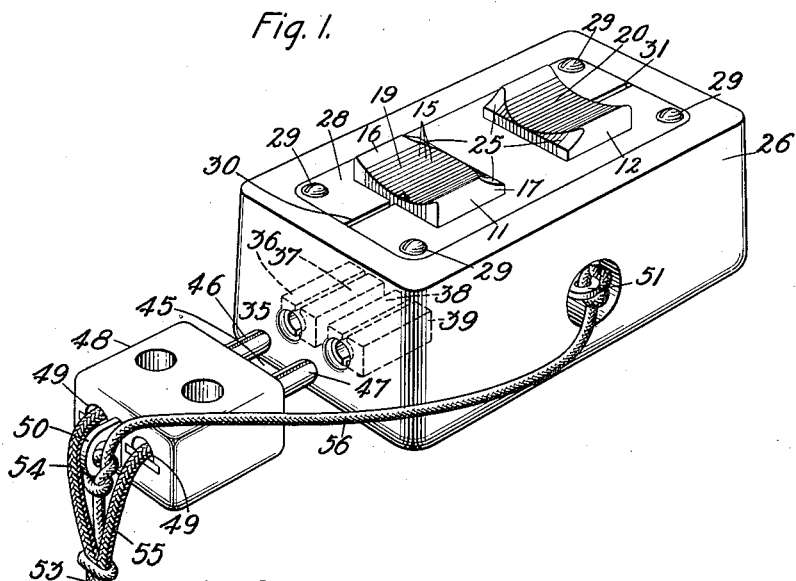
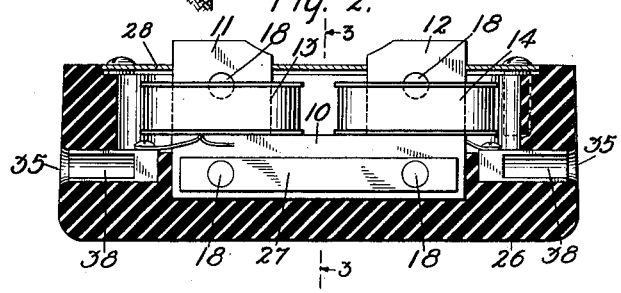
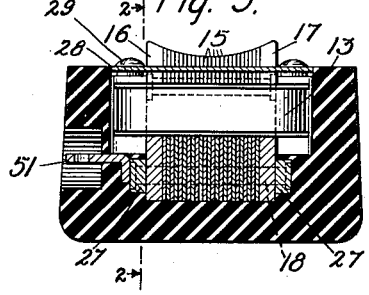
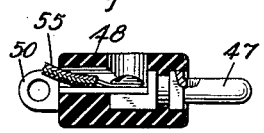
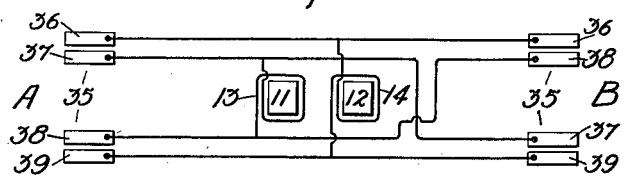
Witnesses:
Inventor:
Hugh M. Stoller:
by
Atty H. M. STOLLER.
FAULT LOCATOR FOR ELECTRIC CABLES.
APPLICATION FILED DEC. 24, 1913.

1,170,017.

Patented Feb. 1, 1916.
2 SHEETS—SHEET 2.

Witnesses:
Roy C Hopgood
Nanon E. Tuthill

Inventor:
Hugh M. Stoller
by J. C. Tanner
Att'y

UNITED STATES PATENT OFFICE.

HUGH MONTGOMERY STOLLER, OF NEW YORK, N. Y., ASSIGNOR, BY MESNE ASSIGNMENTS, TO WESTERN ELECTRIC COMPANY, INCORPORATED, A CORPORATION OF NEW YORK.

FAULT-LOCATOR FOR ELECTRIC CABLES.

1,170,017.  Specification of Letters Patent.  Patented Feb. 1, 1916.

Application filed December 24, 1913. Serial No. 808,561.

*To all whom it may concern:*

Be it known that I, HUGH MONTGOMERY STOLLER, a citizen of the United States, residing at New York, in the county of New York and State of New York, have invented a certain new and useful Improvement in Fault-Locators for Electric Cables, of which the following is a full, clear, concise, and exact description.

This invention relates to the location of faults in electric cables. Its objects in general are the attainment of high efficiency in testing the field of the cable conductors, and the production of an exploring coil capable of ready adaptability and easy manipulation in a variety of ways, according to the nature and location of the fault and the position of the cable.

The invention has especial application to the location of faults in telephone cables, that is to say, to cables comprising twisted pairs of conductors, a special object being to provide an exploring coil sensitive to currents flowing in metallic circuits through the twisted pairs, whereby short-circuits in the pairs may be accurately located.

Cables may be classified generally according to their location or position as "aerial" and "underground," and they are usually provided with a protecting lead sheath. Telephone cables are ordinarily made up of twisted pairs of conductors individually wrapped loosely with paper so that a substantial air space as well as the paper separates and insulates them from each other and the sheath. Trouble which occurs at times in such cables is due to various causes and is usually manifest by a breaking down or lowering of the insulation resistance of one or more of the conductors. At such times it is important that the fault be accurately located and corrected quickly, without unnecessary damage to the cable or its sheath and with the least possible interruption to service of the cable conductors which are not in trouble. The most frequent faults in cables, to the location of which this invention is applicable, may be classified as (1) grounds to conductors, *i. e.*, to conductors of which the insulation to the sheath is low or has broken down, (2) crosses between conductors not of the same pair, and (3) short circuits between conductors of the same pair. These faults may be in combination and caused by moisture entering the cable, and they are in such cases usually termed "wet spots." In order to prepare the faulty conductor or conductors for the location of the fault, a source of intermittent current which may be detected audibly by a telephone receiver, is connected thereto and an exploring coil in circuit with the current detecting instrument is carried along the cable from point to point until the fault is located. Then the sheath is opened at that point, the trouble cleared, and the sheath repaired.

A high degree of efficiency is attained in accordance with this invention by the use of an exploring coil which is provided with a depression in its pole piece transverse to the axis of the magnet coil, *i. e.*, to the central line of the core about which the convolutions of the coil extend so that the exploring coil will fit the surface of the cable with the said axis transverse to the center line or axis of the cable. This form of coil is useful when testing for crosses or grounded conductors. The core is preferably laminated in planes parallel to the axis of the coil and also to the axis of the cable. This core may be either substantially rectangular or U-shaped. The latter is preferred because the U-shape renders it adaptable for uses such as the location of faults in short-circuited pairs, as well as the location of ordinary crosses and grounds. The U-shaped core may be provided with two coils, one on each leg thereof, and when its two coils are properly connected together and in circuit with the current detecting instrument, the device operates in the same manner as a single simple rectangular core with a single coil for locating crosses and grounded conductors. Both of the free pole faces are provided with transverse grooves parallel to the yoke, or are otherwise so shaped or fitted that when the device is applied to the cable it will fit snugly to the surface with the two free pole pieces presented to, that is to say pointing toward, the axis of the cable at different positions longitudinally thereof. There is provided for this U-shaped exploring magnet and its two coils, a casing and two sets of terminal switch members, each set having one member for each end of each coil. The current detecting instrument is preferably connected by a flexible cord with a third set of terminal switch members. The latter may be in the form of twin plugs and the former in the form of sockets or jacks. The connections of the coils to the two sets of switch members are such that when the plug is inserted in the sockets of one set, the two coils are connected together in circuit with the detecting instrument, and when inserted in the sockets of the other set are similarly connected with that instrument, but with one of the coils in reverse position in the circuit. Preferably the two coils are in each case connected in parallel with each other in the circuit of the instrument. The parallel arrangement simplifies the switch structure.

When using the exploring magnet to locate crosses or grounds, the two coils are connected together in such a way that a like magnetic effect on the two free pole pieces will produce a cumulative effect in the current detecting instrument, but when using it for locating short-circuits the coils are oppositely connected, and unlike magnetic effects on the two poles in this case, will produce a cumulative effect in the detecting instrument.

To adapt the exploring magnet for locating short-circuits it is constructed so that the distance between the centers of the two pole pieces is approximately equal to the distance between the centers of adjacent half twists in the cable conductors. Preferably also the width of each pole face is approximately one-half the length of the half twists.

In testing for a fault in an aerial cable which is incased in a metallic sheath, it is necessary to distinguish between the intermittent current applied to the faulty conductor and stray currents which may be flowing in the sheath of the cable. For that reason the exploring magnet is applied to the cable symmetrically, that is to say, with its yoke parallel to the axis or center line of the cable, and with the free ends of its poles pointing transversely thereto. In this position the instrument will not respond to sheath currents with either manner of connection of the two coils in the circuit of the detecting instrument. Therefore the detecting instrument will respond to the intermittent current in the faulty conductor when the exploring magnet is applied to the cable at any point between the point of application of the current and the point where the trouble has occurred, and its non-response in passing the point of trouble enables the tester to locate the fault accurately.

In testing for grounds or crosses in underground cables and in other cables where sheath currents are not troublesome, it may be desirable to apply the exploring magnet with its yoke crosswise to the direction of the cable and with the pole pieces partly straddling it, that is to say, pointing toward either side of it. Accordingly, the inner corners of the pole pieces of the device are flattened so that the device will fit the cable in this position also. When used in this way, the two coils are so connected that opposite magnetic effects on the two pole pieces will produce a cumulative current effect in the detecting instrument.

For a more complete understanding of this invention, reference may be had to the accompanying drawings wherein—

Figure 7:
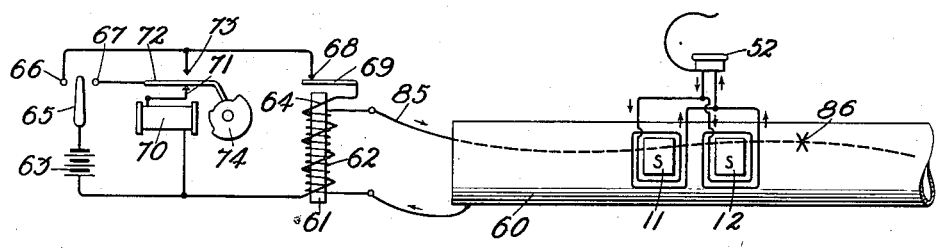
Figure 8:
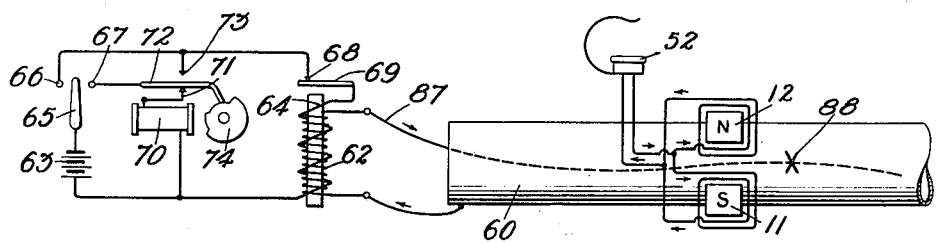

Figure 1 is a view in perspective of the exploring coil and associated set of terminal switch members; Fig. 2 is a view partly in section on line 2—2 of Fig. 3; Fig. 3 is a view on line 3—3 of Fig. 2; Fig. 4 is a view partly in section of the associated set of switch terminal members; Fig. 5 is a diagram of connections between windings of the exploring coil and two sets of terminal switch members; Fig. 6 is a view of the exploring coil, the detecting instrument, the source of testing current, the circuit connections and the position of the exploring coil with respect to an aerial cable when testing for a short-circuit therein. Fig. 7 is a view of the exploring coil, the detecting instrument, the source of testing current, the circuit connections and the position of the exploring coil with respect to an aerial cable when testing for a grounded conductor therein, and Fig. 8 is a view of the exploring coil, the detecting instrument, the source of testing current, the circuit connections and the position of the exploring coil with respect to an underground cable when testing for a grounded conductor therein.

As shown in the drawings, the exploring coil may comprise a U-shaped magnet core having a yoke 10 and pole pieces 11 and 12 with an energizing coil 13 mounted on pole piece 11, and an energizing coil 14 mounted on pole piece 12. In order to reduce core losses, the magnet is preferably built up of laminations 15 held between plates 16 and 17, the laminations and the plates being secured together by means of rods 18. To permit free passage of the flux through the magnet in a direction parallel to the yoke 10, the magnet is built up with the laminations 15 parallel to said yoke. In order that the magnet core may fit the cable when presented thereto with the yoke 10 of the magnet parallel with the axis of the cable, the free ends of the pole pieces 11 and 12 are provided with depressions 19 and 20, respectively, said depressions being parallel to the yoke 10 and the laminations 15 and transverse to the axes of the coils 13 and 14. In order that the magnet core may fit the cable when presented thereto with the yoke 10 transverse to the axis of the cable, the inner corners of the pole pieces 11 and 12 are flattened, as at 25. In order that the coils 13 and 14 may be protected, the magnet core may be provided with a casing 26 of insulating material. It is at times desirable to mold this casing onto the magnet core, and in order that said core may be held in a casing so formed, the core upon each side thereof and near the lower side of the yoke 10, is provided with a bar 27, said bars being secured to the core by means of the rods 18. The top of the casing may be covered with a plate 28 of non-magnetic material, which is secured to said casing by means of screws 29, 29. To prevent a closed secondary circuit being formed in this plate 28, said plate is slotted, as at 30 and 31.

In each end of the casing 26 there is provided a set of terminal switch members 35, each set being composed of individual members 36, 37, 38 and 39. To these individual members are attached the leads from the two coils 13 and 14. As shown in Fig. 5, the leads from the coils 13 and 14 terminate in one position in the individual members of the set at one end of said casing, while at the other end thereof the position of the leads from coil 13 is reversed. As shown in Fig. 1, each two of the individual members may conveniently form a jack adapted for the reception of another set of terminal switch members 45, which may conveniently be in the form of twin plugs associated with a current detecting instrument 52 (Figs. 6, 7 or 8) by means of a cord 53. This set of terminals 45 is composed of two members 46 and 47, which are mounted in a block 48 of insulating material. This block may be provided with openings 49, 49 for the admission of cord conductors 54 and 55 to be connected to the individual members 46 and 47, respectively. There may also be provided in the block 48, a ring 50 to which may be attached a stay-cord 56 for relieving the conductors 54 and 55 from undue strain. The casing 26 which incloses the magnet core and coils of the exploring coil, may also be provided with a ring 51 to which may be attached the stay-cord 56 so that the exploring coil and the associated set of terminal switch members may be secured one to the other. Current may be supplied to the faulty conductor from any suitable apparatus, such, for example, as that shown in Figs. 6, 7 or 8. The apparatus there shown consists of a transformer 61, to the secondary 62 of which may be connected the faulty conductor or conductors. One terminal of a battery 63 is connected to the primary 64 of the transformer 61. The other side of the battery is connected to a switch arm 65, which is adapted to make contact with either terminal 66 or 67. The terminal 66 is connected to the normally closed back contact 68 of the transformer 61. The armature 69, controlled by the energization of the primary winding 64 of the transformer, is connected to said primary winding. One side of the battery 63 is connected to the winding of an electromagnet 70. The other end of the winding of the electromagnet 70 is connected to back contact 71 of the electromagnet 70. A contact arm 72 of said electromagnet is permanently connected to the terminal 67, and normally rests against back contact 71. The electromagnet 70 is also provided with a front contact 73, which is permanently connected to the back contact 68 of the transformer 61. Attraction of armature 74 opens contact 71, 72 and makes contact 72, 73. If an alternating current is desired on the conductors in which there is a fault, the switch arm 65 is moved to make contact with terminal 66 in which case a circuit is closed which may be traced as follows: from one terminal of battery 63, through switch arm 65, terminal 66, back contact 68, armature 69, transformer primary 64, back to the other side of battery 63. Current flowing in this circuit energizes primary winding 64 which thereupon causes the attraction of armature 69, opening contact 68. Winding 64 is thereupon deënergized, causing the armature 69 to be retracted and again closing the circuit. The consequent energizing and deënergizing of the primary 64 of the transformer 61, causes an alternating current to be sent out from the secondary 62 of the transformer 61. Should an intermittent alternating current be desired on the conductor which is being tested, the switch arm 65 is then moved to make contact with terminal 67. Under such conditions a circuit is established which may be traced as follows: from one side of battery 63, through switch arm 65, terminal 67, contact arm 72, back contact 71, winding of the electromagnet 70, back to the other side of battery 63. Current flowing in this circuit causes the energization of electromagnet 70, which causes the attraction of its armature 74, whereupon contact 71, 72 is broken and contact 72, 73 made, establishing a circuit which may be traced as follows: from one side of battery 63, switch arm 65, terminal 67, contact arm 72, front contact 73, back contact 68, armature 69, transformer primary 64, back to the other side of battery 63. Current flowing in this circuit causes the energization of primary 64 of the transformer 61, in which case the armature 69 thereof will be moved in precisely the same manner as when the circuit was established by closing the contact between switch arm 65 and terminal 66, as hereinbefore explained. When back contact 71 was broken, due to the attraction of armature 74, the circuit through electromagnet 70 was broken, and the armature 74 was retracted. The attraction and retraction of the armature 74 causes an intermittent alternating current to be set up in the secondary of the transformer.

In Fig. 6 there is represented a cable having a lead sheath 60 in which is incased a number of pairs of conductors, one pair of which is made up of conductors 80 and 81, which are short-circuited at the point 82. The manner of connecting the current supplying apparatus to this cable, and the manner in which the magnet coils of the exploring coils are connected in circuit with the current detecting instrument, as well as the position in which said exploring coil is held with respect to the cable, will now be described.

The terminals of the secondary 62 of the transformer 61 are connected to the two conductors 80 and 81. With these conductors connected to the secondary of the transformer and the switch arm 65 closed at either terminal 66 or terminal 67, the direction of flow of current at some instant from the transformer secondary along the conductors 80 and 81 may be as indicated by the arrows. Considering this direction of flow of current, it will be seen that, in each half convolution of the two conductors of the pair, the current is flowing in one direction in one conductor, and in the opposite direction in the other conductor. It will be seen that, in effect, each half convolution of the two conductors forms a closed loop in which there is a flow of current. Furthermore it will be seen that in two adjacent loops, the direction of the flow of current around the loop is opposite. The direction of the lines of force set up by the flow of current in two adjacent loops will, therefore, be opposite, and in the case supposed will be as indicated by the letters N and S. It will now be supposed that the exploring coil is presented to the cable with its magnet yoke 10 parallel to the axis of the cable so that the depressions in its pole pieces 11 and 12 will fit the surface of the cable. Furthermore it will be supposed that the pole piece 11 is immediately opposite the loop whose magnetic field is designated S, and the pole piece 12 is immediately opposite the loop whose magnetic field is designated N. The lines of force set up by current in the loop S will, upon cutting the turns of the coil 13, which is carried by the pole piece 11, set up a flow of current in said coil in the direction indicated by the arrows. The lines of force set up by current flowing in the loop N will, upon cutting the turns of the coil 14, which is carried by the pole piece 12, set up a flow of current in said coil in the direction indicated by the arrows. In order, therefore, that the currents in the two coils 13 and 14 may coöperate to produce an effect in the current detecting instrument 52, the said coils will have to be connected in circuit with said detecting instrument in the manner indicated in Fig. 6. Referring to Fig. 5 in connection with the manner in which the coils should be connected in circuit with the current detecting instrument in order to locate a short-circuit, as illustrated in Fig. 6, the twin plugs 45 should be inserted in the jacks of end B of the exploring coil. It will be observed that the direction of the fluxes and of the flow of current above referred to are instantaneous directions and these are continually changing. As the exploring coil is moved along the cable the direction of flow of current in the coils 13 and 14 and in the current detecting instrument in circuit therewith, will change relative to the instantaneous direction of flow of current in the conductors 80 and 81. Current will be detected by the current detecting instrument when the exploring coil is presented to the cable at points between the point of application of the current and the point at which the conductors are short-circuited. Since there is no current flowing in the conductors beyond the point of short circuit, in moving the exploring coil beyond said point, no current will be detected by the current detecting instrument.

In Fig. 7, there is represented an aerial cable, the conductor 85 of which is grounded to the sheath 60 at a point 86. One lead of the transformer secondary 62 is connected to the conductor 85, and the other lead therefrom is connected to the sheath 60. The exploring coil is presented to the cable in the same manner as above described in connection with the locating of a short-circuit. Closure of the circuit through battery 63 and transformer primary 64 at either terminal 66 or terminal 67 will cause a flow of alternating current from the transformer secondary 62, through the conductor 85, grounded connection 86 and the cable sheath 87 back to the transformer secondary 62. The direction of flow of current at some instant through the transformer secondary 62, the faulty conductor 85 and the sheath 60, is as indicated by the arrows adjacent thereto. In this case a flux is set up due to the flow of current in the cable sheath 60, and another due to the flow of current in the faulty conductor 85. The direction of the flux due to current in the cable sheath 60, is concentric with the sheath, and when the magnet core of the exploring coil is presented to the cable in the manner above explained, the axes of the coils 13 and 14 will pass through the center of the cable. Each turn of wire in each coil will lie in a plane perpendicular to the axis of the coil. Consider any line of flux concentric with the sheath which intersects this plane. This line of flux will lie in a plane perpendicular to the plane of the turn of wire and the planes will intersect in a straight line. This straight line will pass through the circumferences formed by the turn of wire and the line of flux. The two points formed by the intersection of the line with the circumference described by the line of flux will be wholly within or wholly without the points formed by the intersection of the line with the circumference of the turn of wire. Therefore, there will be no interlinkage between any concentric line of flux and any turn of wire. Hence it follows that the lines of flux, due to current in the cable sheath, will have no effect whatever on said coils. The flux set up by current in the faulty conductor 85 is not concentric with the cable sheath and a portion thereof will, therefore, interlink with the turns of the coils 13 and 14 and produce a flow of current therein. Assume that the current in the faulty conductor 85 is flowing in the direction indicated by the arrows. When the magnet core of the exploring coil is presented to the cable at points between the point of application of the current and the point 86, the flux acting upon the coils 13 and 14, due to the current in the faulty conductor 85, will be in the same direction, indicated by the letters S, S. The cutting of the turns of the coils 13 and 14 by this flux will set up a flow of current in each coil in the directions indicated by the arrows. In order, therefore, that the currents flowing in the coils 13 and 14 may coöperate to produce an effect in the current detecting instrument 52, the leads from said coils must be connected in circuit with said current detecting instrument 52 in the manner indicated in Fig. 7. Referring to Fig. 5 in connection with the manner in which the coils should be connected in circuit with the current detecting instrument 52 in order to locate a grounded conductor in an aerial cable, as illustrated in Fig. 7, the twin plugs 45 should be inserted in the jacks of end A of the exploring coil. With a reversal of the direction of flow of current through the faulty conductors, the direction of the flux set up thereby and the resulting flow of current in each of the coils 13 and 14 will be reversed. It is obvious that after passing the point 86 at which the conductor 85 is grounded to the sheath, there will be no flow of current in said conductor. Since the detecting circuit as previously explained is affected by conductor current only, there will be no effect produced when the exploring coil is presented to the cable beyond the point 86.

In Fig. 8 there is represented an underground cable in which there is a conductor 87 grounded to the sheath at a point 88. It may be stated that there is a continuous ground on the cable sheath of an underground cable throughout its entire length for the ducts through which said cable runs form a path to ground. Therefore, when one lead from the transformer secondary 62 is connected to the cable sheath 60 and the other to the faulty conductor 87, the current on entering the cable sheath 60 at point 88 will find a parallel path to ground and, in fact, will find an infinite number of parallel paths to ground from the cable sheath. In fact, the number of these paths will be so great that upon reaching a point removed by only a very short distance from the point at which the current enters the cable sheath, there will be an inappreciable flow of current in the cable sheath, the bulk of the current having found its way through the aforesaid parallel paths to ground. The said current will traverse the path through ground to a point close to the point at which the lead from the transformer secondary 62 is connected to the sheath 60. The current will then begin to find its way back to the cable sheath, through an infinite number of similar parallel paths and then back to the transformer secondary 62. It has been found, therefore, that throughout the major length of the underground cable having a faulty conductor therein, the inappreciable flow of current in the sheath may be neglected, and the exploring coil presented to the cable in the manner indicated in Fig. 8 so as to obtain the greatest efficiency. The only current which need be considered is that flowing in the conductor 87. When the direction of flow of current in the conductor 87 is as indicated by the arrow, the flux produced thereby at any one instant will, upon opposite sides of the conductor 87, be opposite as indicated by the letters N and S. To obtain the maximum efficiency, the magnet core of the exploring coil should be presented to the cable with the yoke of said core transverse to the axis of the cable and with the flattened inner corners of pole pieces 11 and 12 fitting the cable sheath as shown in Fig. 8. With the magnet core presented to the cable in this position and with the instantaneous directions of the flux produced by current in the conductor 87 as indicated by the letters N and S, the current set up in the coils 13 and 14, due to the cutting of the turns of said coil by said flux, will have a direction of flow as indicated by the arrows. In order that the currents flowing in the coils 13 and 14 may coöperate to produce an effect in the current detecting instrument 52, the coils should be connected in circuit with said current detecting instrument in the manner indicated in Fig. 8. Referring to Fig. 5 in connection with the manner in which the coils should be connected in circuit with the current detecting instrument 52 in order to locate a grounded conductor in an underground cable, as illustrated in Fig. 8, the twin plugs 45 should be inserted in the jacks of end B of the exploring coil. It is obvious that upon moving the exploring coil beyond the point 88, there will be no flow of current in coils 13 and 14 of said exploring instrument.

What is claimed is:

1. A device for exploring the field of electric cable conductors, comprising a coil, with a magnet core having in its pole face a depression transverse to and intersecting the axis of the coil and adapted to fit the surface of the cable.

2. A device for exploring the field of cable conductors, comprising a coil with a laminated magnet core having in its pole face a depression transverse to and intersecting the axis of the coil and adapted to fit the surface of the cable, the laminations of said magnet being in planes parallel to said axis and also to said depression.

3. In a fault locator for electric cables, the combination with a current detecting instrument and a coil in circuit therewith, of a magnet core for said coil having in its pole face a depression transverse to and intersecting the axis of the coil and adapted to fit the surface of the cable.

4. In a fault locator for electric cables, the combination with a current detecting instrument and a coil in circuit therewith, of a laminated magnet core for said coil having in its pole face a depression transverse to and intersecting the axis of the coil and adapted to fit the surface of the cable, the laminations of said magnet being in planes parallel to said axis and also to said depression.

5. A device for exploring the field of cable conductors comprising a U-shaped magnet core and a winding on each leg thereof, said core having in its pole faces depressions parallel to the yoke thereof and adapted to fit the surface of the cable.

6. A device for exploring the field of cable conductors comprising a U-shaped laminated magnet core and a winding on each leg thereof, said core having in its pole faces depressions parallel to the yoke thereof, adapted to fit the surface of the cable, and the laminations of said core being in a direction parallel to the plane of said U-shaped core.

7. A fault locator for electric cables comprising a current detecting device, a U-shaped magnet core, a pair of windings thereon, a circuit, and switching means for connecting said device and said windings in said circuit and for reversing the connections of one of said windings with respect to the other.

8. A fault locator for electric cables comprising a current detecting device, a U-shaped magnet core, a pair of windings therefor, one for each leg thereof, a circuit, and switching means for connecting said windings in parallel and in said circuit with said device and for reversing at will the connections of one of said windings with respect to the other.

9. A device for exploring the field of cable conductors, comprising a U-shaped magnet core, adapted to fit the surface of the cable with its free poles presented to the axis of the cable at different points longitudinally thereof, two coils, one on each leg of said core, a casing for said coils and core, and two like sets of switch terminals carried by said casing, each set comprising terminals for said coils and the terminals for one of said coils being reversely positioned in the two sets.

10. A device for exploring the field of cable conductors, comprising a U-shaped electromagnet having the free pole pieces shaped so as to fit the surface of the cable when presented thereto, with the yoke of said magnet either parallel with, or transverse to, the axis of the cable.

11. A device for exploring the field of cable conductors, comprising a U-shaped electromagnet having in the surface of its pole pieces depressions parallel with its yoke and the inner corners of said pole pieces being flattened, whereby the electromagnet will fit the surface of the cable when said pole pieces are presented thereto with the yoke of said magnet either parallel with or transverse to the axis of the cable.

In witness whereof, I hereunto subscribe my name this 22d day of December, A. D. 1913.

HUGH MONTGOMERY STOLLER.

Witnesses:
NANON E. TUTHILL,
ALICE HAZLEY.